US008737760B2

(12) United States Patent
Olsson et al.

(10) Patent No.: US 8,737,760 B2
(45) Date of Patent: May 27, 2014

(54) IMAGE PROCESSING METHOD FOR SUPPRESSING SPATIO-TEMPORAL COLUMN OR ROW NOISE

(75) Inventors: Stefan Olsson, Stockholm (SE); Emanuel Johansson, Solna (SE)

(73) Assignee: Flir Systems AB, Danderyd (SE)

( * ) Notice: Subject to any disclaimer, the term of this patent is extended or adjusted under 35 U.S.C. 154(b) by 234 days.

(21) Appl. No.: 13/265,425

(22) PCT Filed: Apr. 19, 2010

(86) PCT No.: PCT/SE2010/000099
§ 371 (c)(1),
(2), (4) Date: Oct. 20, 2011

(87) PCT Pub. No.: WO2010/123428
PCT Pub. Date: Oct. 28, 2010

(65) Prior Publication Data
US 2012/0039544 A1    Feb. 16, 2012

(30) Foreign Application Priority Data

Apr. 22, 2009  (SE) ..................... 0900533

(51) Int. Cl.
*G06K 9/40* (2006.01)
(52) U.S. Cl.
USPC ..................... 382/264; 250/338.1
(58) Field of Classification Search
CPC .................................. H04N 5/3658
See application file for complete search history.

(56) References Cited

U.S. PATENT DOCUMENTS 5,065,444 A    11/1991   Garber

| 8,208,026 B2* | 6/2012 | Hogasten et al. ............. 348/164 |
| 2002/0159648 A1 | 10/2002 | Alderson et al. |
| 2007/0019085 A1 | 1/2007 | Suzuki |

(Continued)

FOREIGN PATENT DOCUMENTS

| EP | 0653882 A1 | 5/1995 |
| WO | WO-9741682 A1 | 11/1997 |
| WO | WO-9847102 A2 | 10/1998 |
| WO | WO-03073751 A1 | 9/2003 |

OTHER PUBLICATIONS

Driggers, Ronald G., Richard Vollmerhausen, and Keith Krapels. "Target identification performance as a function of temporal and fixed pattern noise." Optical Engineering 40.3 (2001): 443-447.*
PCT/ISA/210—International Search Report—Jun. 30, 2010.

(Continued)

*Primary Examiner* — Bhavesh Mehta
*Assistant Examiner* — Andrew Moyer
(74) *Attorney, Agent, or Firm* — Venable LLP; Eric J. Franklin

(57) ABSTRACT

An image processing method and to an arrangement for implementing the method. The method includes filtering the original image with a low-pass filter for forming a low-pass filtered image, creating a high-pass filtered image by subtracting the low-pass filtered image from the original image, forming intermediate values from the created high-pass filtered image based on column-wise selection of pixel values in the suppression of column noise and row-wise selection of pixel values in the suppression of row noise, and subtracting formed intermediate values column-by-column and row-by-row from the original image. The arrangement includes a non-linear, one-dimensional digital finite impulse response filter, a computing unit for column-wise or row-wise formation of intermediate values, an image storage unit and a subtraction unit.

13 Claims, 4 Drawing Sheets

(56) References Cited

U.S. PATENT DOCUMENTS

| | | | |
|---|---|---|---|
| 2007/0120058 A1* | 5/2007 | Blackwell et al. | 250/338.1 |
| 2008/0036792 A1* | 2/2008 | Liang et al. | 345/660 |
| 2008/0187236 A1* | 8/2008 | Van Der Heijden | 382/263 |
| 2010/0220193 A1* | 9/2010 | Hogasten et al. | 348/164 |

OTHER PUBLICATIONS

PCT/ISA/237—Written Opinion of the International Searching Authority—Jun. 30, 2010.

European Search Report—Apr. 18, 2013 (Issued in Counterpart Application No. 10767375.8).

* cited by examiner

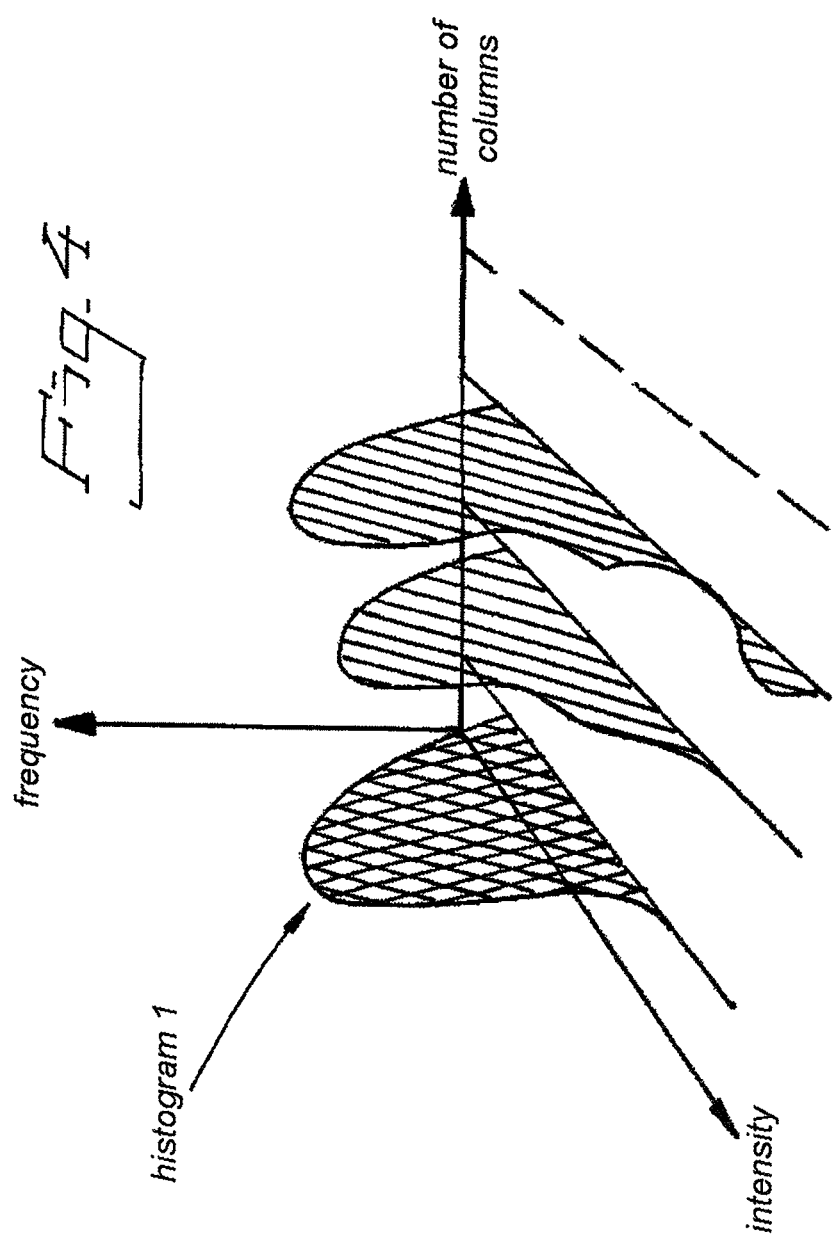

IMAGE PROCESSING METHOD FOR SUPPRESSING SPATIO-TEMPORAL COLUMN OR ROW NOISE

CROSS-REFERENCE TO RELATED APPLICATIONS

This application is the national phase of PCT/SE2010/000099 filed 19 Apr. 2010.

FIELD OF THE INVENTION

The present invention relates to an image processing method for suppressing spatio-temporal column or row noise over an original image detected by an IR detector, such as a focal plane array for IR detection, comprising filtration of the original image by means of a low-pass filter for forming a low-pass filtered image and for creation of a high-pass filtered image by subtracting the low-pass filtered image from the original image. The invention also relates to an arrangement for implementing the image processing method involving the suppression of spatio-temporal column or row noise. The invention is primarily intended for application in connection with IR detection using focal plane arrays, so-called FPA detectors, but does not preclude other fields of application.

BACKGROUND OF THE INVENTION

US 20020159648 A1 shows the creation of a high-pass filtered image in a manner similar to that described in the previous paragraph.

It is a known fact that insufficient stability of the offset level for individual columns or rows over a focal plane array for IR detection, IR-FPA, can cause serious image disturbances in the form of pattern noise. In the case of low signal-to-noise ratios, the image is perceived as striped. In general, the offset level of the columns and rows deviates over time, which means that the resulting noise is spatio-temporal in nature. Usually, offset errors are calibrated over an IR-FPA, by having the array illuminated with a uniform radiator and then digitally deducting the offset level for the individual pixels, so-called image unevenness correction.

A problem in eliminating pattern noise according to the above-described process is that the pattern noise must be stable over time. This is seldom the case, however, as regards the offset level for columns and rows. Furthermore, an IR-FPA, apart from an offset correction, must also be corrected for errors in the amplification of individual pixels. This is done by digitally multiplying the amplification of the pixels by correction factors measured by illuminating an IR-FPA with uniform radiators at different temperatures. For this correction to be effective, it is also required that the pattern noise caused by offset errors is unchanged over time. Since this often is not the case for column and/or row noise, there is a risk that the offset error affects the measurement of the amplification corrections. This error will also appear in the form of a static column and/or row noise.

SUMMARY OF THE INVENTION

The object of the present invention is to provide a method and an arrangement which effectively reduce spatio-temporal column/row noise over an IR detector and thereby eliminate the perception of stripiness in the image.

The object of the invention is achieved by a method according to the first paragraph characterized by the following steps:

a. formation of intermediate values in the form of offset values from the created high-pass filtered image, based on column-wise selection of pixel values in the suppression of column noise, and row-wise selection of pixel values in the suppression of row noise, b. subtraction of formed intermediate values, column-by-column and row-by-row, from the original image.

As has been stated above, the column noise/the row noise is spatio-temporal in nature. The frequency of the spatial component is normally stable, whilst the temporal component varies virtually at random, which makes it difficult to customize an effective temporal band-pass filter. The method according to the invention solves this problem by acting non-linearly on each image frame and the resolution is limited only by the image frequency.

It can here be noted that an intermediate value in column-wise selection corresponds to column offset, whilst an intermediate value in row-wise selection corresponds to row offset.

An intermediate value can be formed in a number of different ways and expediently adjusted to prevailing requirements. According to an especially proposed method, an intermediate value can be formed based on all pixel values in a column and row respectively. Alternatively, an intermediate value can be formed based on a regular selection of pixel values in a column and row respectively, in which the selection is constituted by every nth. pixel value where n assumes a greater value than 1 and less than half the number of pixel values in a column and row respectively of the original image. The choice can be determined by the supply of computing capacity, the image quality requirements, and so on.

Advantageously, in a proposed method according to the invention, the intermediate value is constituted by a median value. The inputting of median values results in very stable values being obtained, since the influence of extreme values can be severely limited. The use of median values means that a small but sharp object, for example a car, does not affect the correction value which is to be subtracted column-by-column or row-by-row from the original image.

According to a proposed embodiment of a method according to the invention, the median value is obtained by the fact that a histogram is formed by the selection of pixel values and the median value is set to the pixel value which applies when half the number of pixels has been summated. The proposed method shows an expedient way of forming median values, but other known methods can also be applied.

Advantageously, the filtration of the original image can be carried out with an edge-preserving bilateral low-pass filter, and it is especially proposed that the filtration is carried out by means of a one-dimensional FIR filter having a core which is the product of a spatial core and an intensity-dependent core according to the relationship:

$$W_i = W_R \cdot W_S = \sum_j e^{-(d_i-d_j)^2/2\sigma_S^2} \cdot \sum_j e^{-(I_i-I_j)^2/2\sigma_R^2}$$

where
d stands for the spatial distance between individual pixels,
I stands for the intensity of individual pixel values,
$\sigma_S$ indicates the width of the spatial core, which is Gaussian-distributed, and
$\sigma_I$ indicates the width of the intensity-dependent core, which is Gaussian-distributed.

The edges in the image which can complicate the column-wise or row-wise calculation of median values in a vector, termed column offset and row offset respectively, are excluded by the bilateral filtering. A digital filter is achieved which works very effectively to reduce spatio-temporal column/row noise over an FPA. The filter design prevents important details in the image from being erased, and in most cases the perception of stripiness is wholly eliminated without the image being otherwise affected.

According to another proposed embodiment of the invention, the intermediate value is constituted by a mean value. Here it is also proposed that the original image is low-pass filtered by making a core in one dimension roam row-by-row/column-by-column over the original image and replace the value of the middle pixel in the core with the mean value of other pixels in the core. It is further proposed that the mean value constituting the intermediate value is calculated column-by-column/row-by-row from the high-pass filtered image created by subtraction of the low-pass filtered image from the original image. The method using mean value calculations allows simple and rapid calculations with good results, without being as general from a mathematical perspective as the use of median values and more complex filtering functions.

In order to eliminate the influence of extreme values on formed mean values, it is further proposed according to a further expedient embodiment of the method that a threshold value for the pixel values is inputted in the mean value calculation so as to exclude values which differ more than the threshold value from other values. This gives an edge-preserving effect. The image information relating to extreme values is not therefore incorporated in the correction terms in the column offset or the row offset.

The arrangement for implementing the image processing method is characterized in that the arrangement comprises a non-linear, one-dimensional digital FIR filter (Finite Impulse Response filter), a computing unit for column-wise or row-wise formation of intermediate values, an image storage unit and a subtraction unit.

Advantageously, the comprised filter and other units can be constituted by one or more programmed signal processors.

As the filter is particularly proposed a digital, bilateral, FIR filter of the edge-preserving type with a core constituted by the product of a spatial core and an intensity-dependent core.

Expediently, the filter is configured such that the core of the FIR filter contains the following product:

$$W_i = W_R \cdot W_S = \sum_j e^{-(d_i - d_j)^2 / 2\sigma_S^2} \cdot \sum_j e^{-(l_i - l_j)^2 / 2\sigma_R^2}$$

It is also proposed that the digital FIR filter has a Gaussian core.

BRIEF DESCRIPTION OF THE DRAWINGS

The invention will be described in greater detail below with reference to the appended drawing, in which:

FIG. 4 shows a column histogram describing the distribution of the filtered values for each column.

Figure 1:
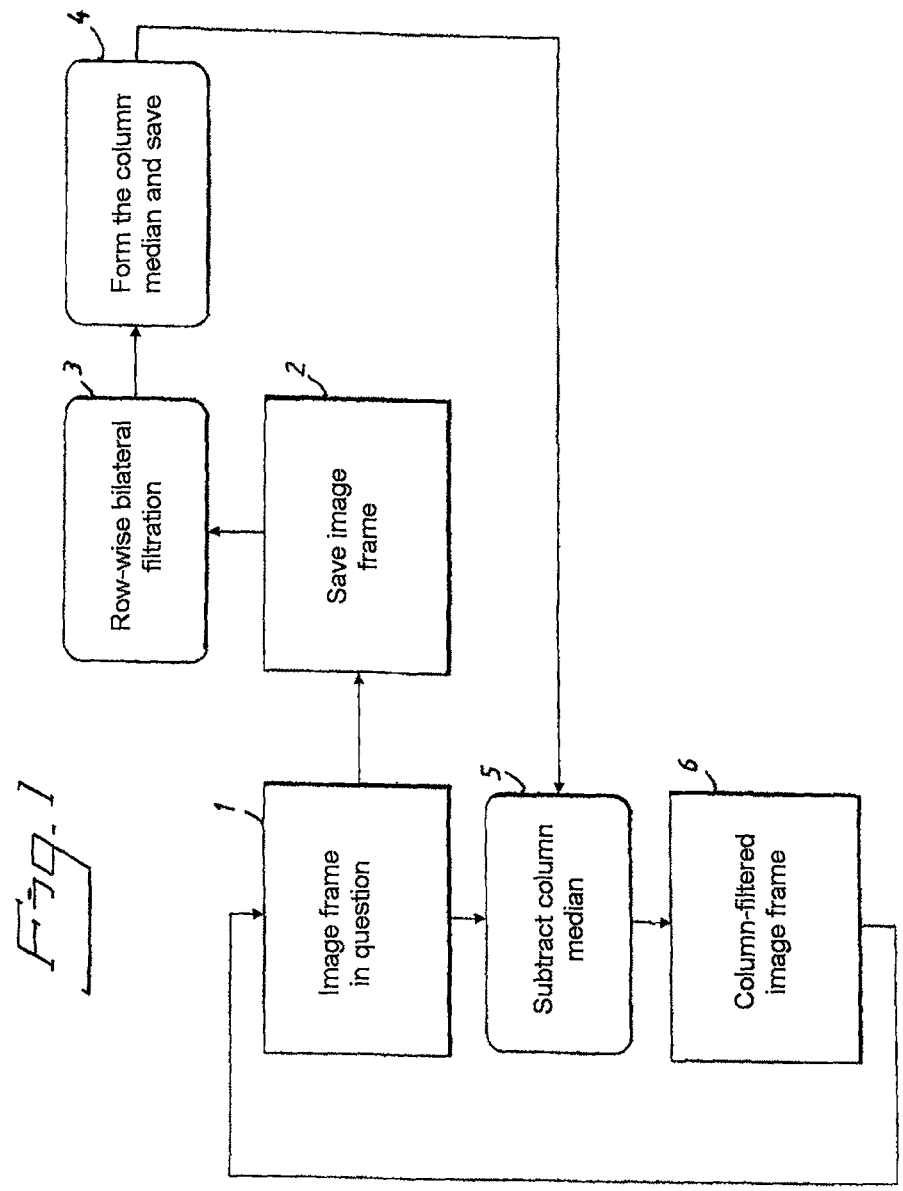
FIG. 1 illustrates, in schematic block diagram form, the method according to the invention.

The function of the blocks which make up the block diagram according to FIG. 1 is firstly described below.

DETAILED DESCRIPTION OF EMBODIMENTS OF THE INVENTION

In block 1 is found the original image detected by an IR detector. A normally uncooled detector is a focal plane array for IR detection, termed IR-FPA. The way in which column noise is reduced in the use of such a detector is described below. This does not however preclude use of other IR detectors, both of the cooled and uncooled type. Row noise can be eliminated according to similar principles and will therefore not be discussed in detail below. The original image is fetched from the block 1 to a block 2, where it can be stored prior to processing in the form of, for example, filtration, calculation of median values and/or mean values, etc.

In the block 3, a row-wise filtration takes place of the original image stored in the block 2. The basic principle is that the original image first undergoes a low-pass filtration and thereafter a high-pass filtered image is formed by subtracting the low-pass filtered image from the original image. Based on the high-pass filtered image, column-wise intermediate values in the form of median values or mean values are formed in a block 4. In a further block 5, these intermediate values are subtracted from an original image in question delivered by the block 1. The original image delivered from the block 1 is in a real-time system the same original image which was delivered to the block 2. In a system which permits more delay, the intermediate values are instead subtracted from a subsequent original image delivered by the block 1. As the final image, a column-filtered image is obtained in the block 6, which does not have the stripes which are often found in an original image from an IR-FPA.

By intermediate values is meant, above all, median values or mean values. The pattern for these two variants, and, first, the median solution, will therefore be described more specifically below.

With reference to block 1 and 2, a non-linear, one-dimensional FIR filter is applied row-by-row over the original image. The filter is a bilateral edge-preserving high-pass filter, in which the core of the filter is the product of a spatial core and an intensity-dependent core. The following relationship shows the core of the filter:

$$W_i = W_R \cdot W_S = \sum_j e^{-(d_i - d_j)^2 / 2\sigma_S^2} \cdot \sum_j e^{-(l_i - l_j)^2 / 2\sigma_R^2}$$

Both the spatial core and the intensity-dependent core are Gaussian-distributed, with a width which is given by $\sigma_S$ and $\sigma_I$ respectively.

Figure 2:
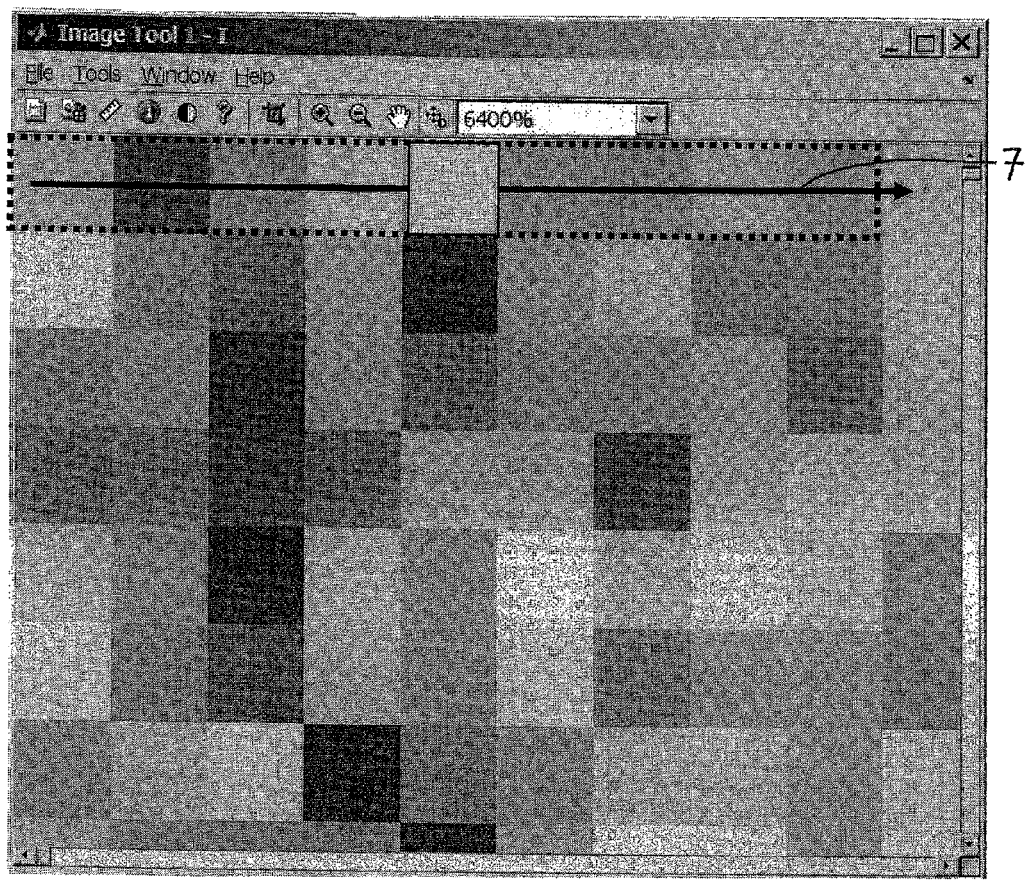
FIG. 2 illustrates the principle for the application of a filter.

In FIG. 2, an arrow 7 shows how the filter is applied row-by-row. A column histogram describing the distribution of the filtered values for each column and corresponding to the grey scales in FIG. 2 is updated for each new row which is read in. In FIG. 4, examples of column histograms are shown, in which the coordinate axes denote the number of columns, intensity and frequency according to text stated in the figure and in which a first histogram has been specially marked as histogram 1. Once the last row is read in, the median value is obtained by a summation of the columns in the histogram. The median value is defined as the pixel value which applies when the summation has reached half the number of pixels in the column. As a result, from the block 2 a vector is obtained having a length which is equal to the number of columns and in which each value is the column median of the filtered image. The vector is termed column offset (CO). In the block 5, all pixel values in each column of a supplied image, which can be the very next image delivered from the block 1, are subtracted, with corresponding column offset.

A description of an alternative solution using mean value formation follows below. The method is not as general from a mathematical perspective, but allows a quicker and simpler calculation process. In this case, a simplified filtering core is used, at the same time as the edge-preserving effect is made use of later. As in the median case, a core is applied in one dimension row-by-row over the image. When the core roams over the row, the value of the middle pixel in the core is replaced by the mean value of all other pixels in the core. In this way, a low-pass filtration of the original image is obtained. This low-pass filtered image is subtracted from the original image and a high-pass filtered image is obtained with high-frequency noise and possible sharp edges. The calculation of the column offset (CO) is then made by calculating the mean value for each column of the high-pass filtered image. This operation is less demanding in computing terms than to calculate the median. The median has the advantage, however, that a small but sharp object, for example a car, does not affect the correction value for a column to any particularly great extent. In order to make use of this in the formation of a mean value, and hence also obtain an edge-preserving effect, a threshold value is inputted for the pixels in each column. All pixel values which, following filtration, differ more than this threshold value from the other pixel values in the column are not included in the mean value calculation. This image information is not then incorporated in the correction terms or the column offset. The threshold value can be measured in dependence on the detector type and is related to the noise threshold of the detector. The aim is that the threshold value shall include as much of the noise as possible, but as little as possible of the factual image information. Thereafter, the column offset is subtracted from the original image delivered by the block 1.

In FIGS. 3a-3d, the result of the image processing is shown schematically in four different phases. The image shown in FIG. 3a aims to mirror the original image delivered by block 1 in FIG. 1. The image has been illustrated with a frequency diagram 8, which aims to mirror the ideal image without disturbing stripes. Apart from this, stripes 9 are found which are pictorially indicated as just stripes.

Figure 3A:
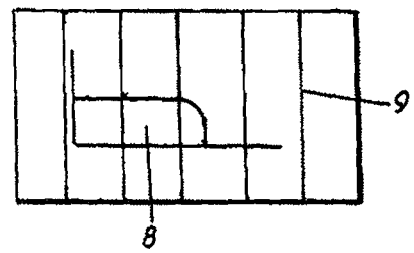
FIGS. 3a-3d illustrate schematically the result of the image processing in different phases.
Figure 3B:
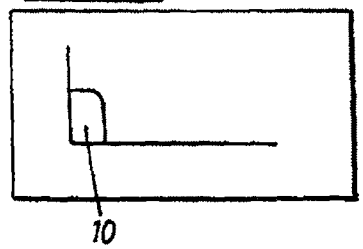
Figure 3C:
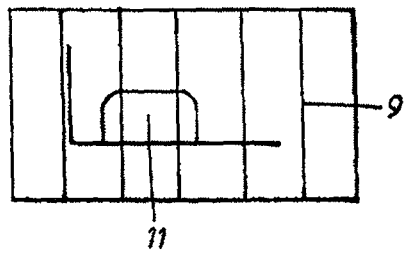
Figure 3D:
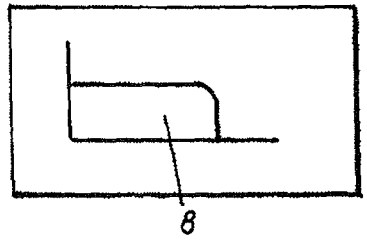

In the block 3, a low-pass-filtration is carried out, and the result of this filtration is shown as a frequency diagram 10 in FIG. 3b. In the block 3, a subtraction of the low-pass filtered image from the original image delivered by an IR detector is also carried out. The result of the subtraction is shown schematically in FIG. 3c, in which a frequency diagram without low-pass part 11 is shown together with the stripes 9. The image content in FIG. 3c is processed in the block 4 to produce a vector containing column offset information. This can involve median value formation or mean value formation according to the principles which have already been described above and are therefore not described here. The column offset information is subtracted from an original image, and an image illustrated in FIG. 3d is obtained which is substantially free from stripes and in principle reproduces the image such as it arrived at the detector, and here illustrated as a frequency diagram. The substantially stripe-free image is found in block 6 in FIG. 1.

The invention is not limited to the embodiments described as examples above, but can be subjected to modifications within the scope of the following patent claims.

The invention claimed is:

1. An image processing method for suppressing spatio-temporal column or row noise over an original image detected by an IR detector, the method comprising:
   filtering the original image by a low-pass filter for forming a low-pass filtered image,
   creating a high-pass filtered image by subtracting the low-pass filtered image from the original image,
   forming intermediate values in the form of offset values from the created high-pass filtered image, based on column-wise selection of pixel values in the suppression of column noise, and row-wise selection of pixel values in the suppression of row noise, and subtracting formed intermediate values, column-by-column and row-by-row, from the original image,
   wherein the filtration of the original image is carried out with an edge-preserving bilateral low-pass filter, wherein the filtration is carried out by a one-dimensional finite impulse response filter having a core which is the product of a spatial core and an intensity-dependent core according to the relationship:

$$W_i = W_R \cdot W_S = \sum_j e^{-(d_i - d_j)^2 / 2\sigma_S^2} \cdot \sum_j e^{-(I_i - I_j)^2 / 2\sigma_R^2}$$

where
   d stands for the spatial distance between individual pixels,
   I stands for the intensity of individual pixel values,
   $\sigma_S$ indicates the width of the spatial core, which is Gaussian-distributed, and
   $\sigma_I$ indicates the width of the intensity-dependent core, which is Gaussian-distributed.

2. The method according to claim 1, further comprising: forming an intermediate value based on all pixel values in a column and row respectively.

3. The method according to claim 1, further comprising: forming an intermediate value based on a regular selection of pixel values in a column and row respectively, in which the selection is constituted by every nth pixel value where n assumes a greater value than 1 and less than half the number of pixel values in a column and row respectively of the original image.

4. The method according to claim 1, wherein the intermediate value comprises a median value.

5. The method according to claim 3, further comprising: forming a histogram by selecting pixel values, wherein the median value is set to the pixel value which applies when half the number of pixels has been summated.

6. The method according to claim 1, wherein the intermediate value is constituted by a mean value.

7. The method according to claim 6, further comprising: low-pass filtering the original image by making a core in one dimension roam row-by-row/column-by-column over the original image and replace the value of the middle pixel in the core with the mean value of other pixels in the core.

8. The method according to claim 7, wherein the mean value constituting the intermediate value is calculated column-by-column/row-by-row from the high-pass filtered image created by subtraction of the low-pass filtered image from the original image.

9. The method according to claim 8, wherein a threshold value for the pixel values is inputted in the mean value calculation so as to exclude values which differ more than the threshold value from other values.

10. An arrangement for implementing an image processing method comprising suppression of spatio-temporal column or row noise, the arrangement comprising:

a non-linear, one-dimensional digital finite impulse response filter configured to filter an original image to form a low-pass filtered image, a computing unit for column-wise or row-wise formation of intermediate values in the form of offset values from the filtered image, an image storage unit configured to store image data, and a subtraction unit configured to subtract the formed intermediate values from the original image, wherein the core of the digital finite impulse response filter comprises the following product:

$$W_i = W_R \cdot W_S = \sum_j e^{-(d_i-d_j)^2/2\sigma_S^2} \cdot \sum_j e^{-(I_i-I_j)^2/2\sigma_R^2}$$

where d stands for the spatial distance between individual pixels,

I stands for the intensity of individual pixel values, $\sigma_S$ indicates the width of the spatial core, which is Gaussian-distributed, and $\sigma_I$ indicates the width of the intensity-dependent core, which is Gaussian-distributed.

11. The arrangement according to claim 10, wherein the filter, the computing unit, the image storage unit and the subtraction unit comprise at least one programmed signal processor.

12. The arrangement according to claim 10, wherein the digital finite impulse response filter is a bilaterally edge-preserving type with a core comprising the product of a spatial core and an intensity-dependent core.

13. The arrangement according to claim 10, wherein the digital finite impulse response filter has a Gaussian core.

* * * * *